Nov. 9, 1926.
F. HEITZLER
VIEWING APPARATUS
Filed Sept. 20, 1924
1,606,702
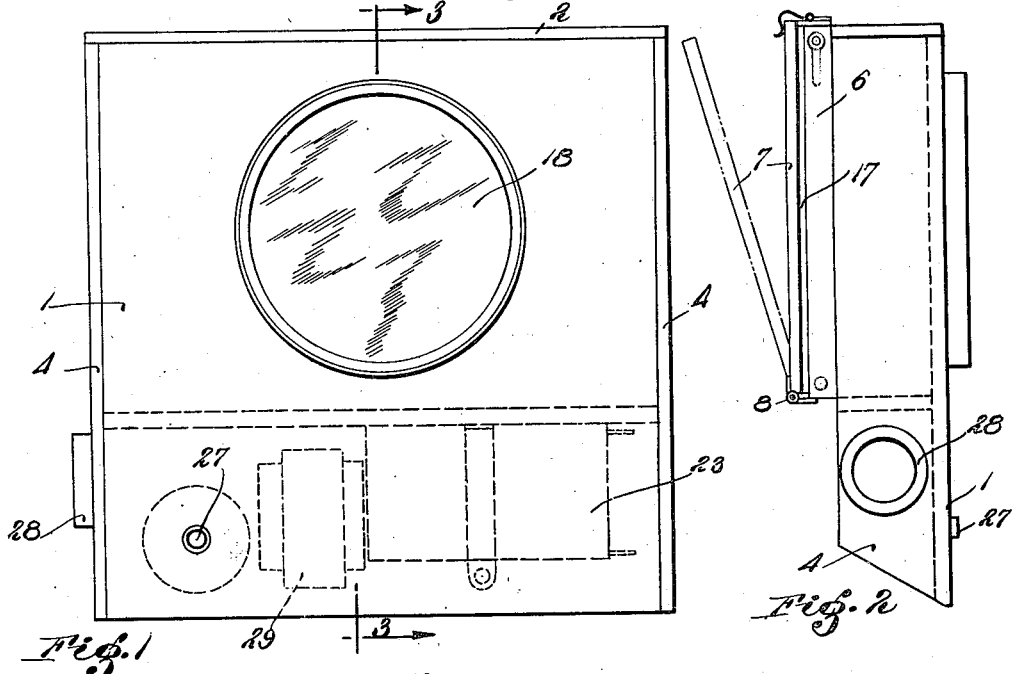
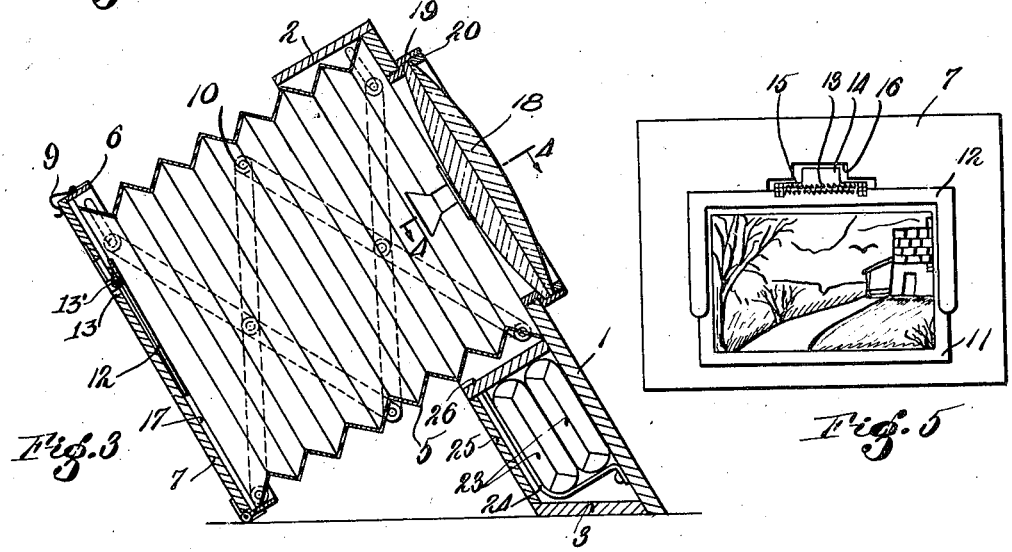
Inventor:
Frank Heitzler,
by Roberts, Roberts & Cushman
attys.

Patented Nov. 9, 1926.

1,606,702

UNITED STATES PATENT OFFICE.

FRANK HEITZLER, OF BOSTON, MASSACHUSETTS.

VIEWING APPARATUS.

Application filed September 20, 1924. Serial No. 738,834

This invention relates to a viewing apparatus particularly useful in examining pictures, money, signatures, finger prints, textiles, stamps and similar objects for the purpose of closely observing minute details in order to detect forgeries, discrepancies, imperfections or for other reasons.

Objects of the invention are to provide a compact and portable viewing apparatus which may be adjusted to the vision of the user in a simple and convenient manner; and to provide such an apparatus which may be simply constructed, inexpensively manufactured and has the new and improved features of construction and arrangement hereinafter pointed out.

In order that the invention may clearly be understood a preferred form of the invention is illustrated in the accompanying drawings, in which:—

Fig. 1 is a front elevation of the viewing apparatus;

Fig. 2 is an end view;

Fig. 3 is a section on the line 3—3 of Fig. 1;

Fig. 4 is a section on the line 4—4 of Fig. 3; and

Fig. 5 is an elevation showing the inner side of the back plate of the apparatus.

Referring to the drawings, the viewing apparatus comprises a case of wood or other suitable material having a rectangular front plate 1 to which is secured the top 2 and supporting base 3, the latter preferably forming an acute angle with the front plate 1 to support the apparatus in an inclined position so that the object may readily be examined without making it necessary for the user to bend over or sit. Also secured to the front plate 1 and extending rearwardly thereof are the sides 4 which are of the same width as the top 2.

The back of the case comprises a frame 6 to which the back plate 7 is pivotally connected by a hinge 8, the back plate normally being held closed against the frame by a spring clip 9. The frame 6 is extensible from the remainder of the case so that the object to be examined can be moved closer to or farther away from the lens, as will hereinafter be described. For this purpose a bellows 5 of leather or other suitable material is fastened to the rear face of the front plate 1 at one end and to the frame 6 at the other end.

In order to support and guide the frame 6 in its movement relatively to the front plate, lazy tongs 10 are connected at one end to the sides 4 and at the other end to the frame 6. In this manner the frame 6 and back plate 7 can readily be moved toward or away from the front plate and throughout such movement the back plate will always remain parallel to the front plate. It will be observed that the frame 6 is considerably shorter than the front plate so that the apparatus will tilt rearwardly substantially as shown to facilitate examination as above mentioned.

The sheet or object to be examined is held in position against the back plate 7 by a substantially U-shaped clamp 12 which is pivoted to the back plate by means of a pin 13 which lies in a recess 13' in the back plate (see Fig. 3), the clamp having a tongue 14 which is adapted to be pressed into the recess 13' for moving the clamp away from the back plate. In order yieldingly to hold the clamp 12 against the back plate a coil spring 15 encircles the pin 13 and is arranged to exert a force against the clamp in the direction of the plate 7. It will be understood that the back plate 7 is unlatched from the frame and swung rearwardly as indicated in Fig. 2, to permit a picture or other object to be clamped thereto. Manifestly if desired the clamp may be arranged to swing about a vertical, rather than a horizontal pivot, and under some circumstances a plurality of clamps may be employed.

Under some conditions it will be desirable to examine objects which are too large to fit under the clamp 12, and to take care of this condition a slot 17 is provided between the back plate 7 and frame 6 on each side. In this manner comparatively large sheets may be inserted through the openings 17 with portions extending on opposite sides of the case so that the portion of the sheet to be examined can properly be positioned. This slot is also adapted to admit a slide, similar to that of a camera plate holder, to which the object to be examined may be attached, if desired.

The magnifying lens of the apparatus is mounted in the front plate 1 and for this purpose a cell 19 is secured in an opening in the front plate and the peripheral edge of the lens rests against a shoulder in the cell. Screwed into the cell 19 and bearing against the opposite face of the lens is a ring 20 which holds the lens in position. Although any suitable lens may be used, I have found that the best results are obtained by using a semi-achromatic reading glass corrected for chromatic or spherical aberration.

For illuminating the object being examined a pair of lamps 21 having reflectors 22 are secured to the front plate 1, one lamp being mounted at each side of the lens 18. These lamps are arranged to direct the light convergingly toward the back plate so that the entire object will be illuminated. Current is supplied to the lamps from the battery 23, and a switch button 27 is provided in the front plate 1 to turn on the current whenever desired. The battery 23 is held against the front plate 1 by a spring clamp 24 and is surrounded by a housing which comprises the front plate 1, supporting base 3, a rear wall 25 and a top wall 26 the latter also providing the bottom wall of the case. A socket 28 is also provided on one side wall 4 and is connected through a transformer 29 and the switch actuated by button 27 with the lamps 21 so that a plug connected with a household lighting fixture may be screwed into the socket 28 for supplying electric current to the lamps.

An outstanding characteristic of the invention consists in the provision of an extensible element in a viewing apparatus which is constructed to receive the object to be viewed so that the position of the object relatively to the lens can readily be adjusted to the vision of the user. Another unique feature consists in that the apparatus is capable of receiving objects of different sizes so that the scope of usefulness of the apparatus is very great. The simple, compact and portable construction also lends itself admirably for use under widely varied conditions.

Although I have shown and described a preferred embodiment of the invention it will be understood that numerous changes in details of construction and arrangement may be effected without departing from the spirit of the invention.

I claim:—

1. A viewing apparatus comprising a case having relatively movable and substantially parallel back and front portions, extensible means between these portions designed to exclude light and to be adjusted to hold the back and front at the desired distance apart, a lens mounted upon the front portion and means to hold the object to be viewed upon the rear portion, a lamp adjacent the lens arranged so that direct rays therefrom are not visible through the lens an extension upon the lower portion of the front wall comprising a battery box whereby the parallel front and rear walls of the casing may be placed on a plane surface at an inclined angle to the same, their relative position and inclination depending upon the degree of adjustment of the extensible means.

2. A viewing apparatus comprising a rearwardly inclined case having a hollow foot portion at its front and a rear portion comprising a frame movable toward and from the front of the case, bellows of substantially the same transverse dimension from end to end, said bellows connecting the frame and the front portion of the case, lazy tongs also connecting the frame and front portions of the case and adapted to hold them in adjusted relation to each other, a back pivoted to the frame and arranged to swing rearwardly from the plane of the frame to permit objects to be examined to be inserted from the outside of the case, a lens mounted in the front of the case, a lamp mounted in the front portion of the case adjacent to but below the lens and arranged to direct light upon an object mounted upon the pivoted back and means operable from the outside of the case for lighting the lamp.

3. A viewing apparatus comprising a case having rigid front and side walls and a back consisting of a frame and a back plate hinged thereto, collapsible bellows connecting said frame and the front portion of the case to enable said back to be extended relatively to the front of the case said bellows being substantially as large in transverse section at its front end as at its rear end means for supporting said back in spaced relation to the front portion of the case a slot being provided between the frame and the back plate through which an object to be examined may be inserted, a lens of a diameter substantially as great as the minimum transverse interior width of the bellows, said lens being mounted in the front of the case, a lamp mounted in the front of the case at a point to one side of the lens, a socket connected to the case to receive a plug for supplying electric current to said lamp, and a switch on the front portion of the case for controlling the current for lighting the lamp.

4. A viewing apparatus comprising a casing including a lens carrying front, a parallel back adapted to constitute an object support, and means connecting said front and back permitting movements thereof toward and from each other, said front being longer in one direction than said back whereby said casing assumes in use a position with its front in an inclined position.

Signed by me at Boston, Mass., this 16th day of September 1924.

FRANK HEITZLER.